United States Patent
Hill et al.

(10) Patent No.: US 9,743,149 B2
(45) Date of Patent: Aug. 22, 2017

(54) SEARCH QUERY COLUMN FOR INTERNET-CONNECTED TV'S

(75) Inventors: Seth Hill, La Mesa, CA (US); Steven Friedlander, San Diego, CA (US); Sabrina Tai-Chen Yeh, Laguna Beach, CA (US); Yuko Nishikawa, La Jolla, CA (US)

(73) Assignee: SONY CORPORATION, Tokyo (JP)

( * ) Notice: Subject to any disclaimer, the term of this patent is extended or adjusted under 35 U.S.C. 154(b) by 869 days.

(21) Appl. No.: 12/917,678

(22) Filed: Nov. 2, 2010

(65) Prior Publication Data

US 2012/0110623 A1 May 3, 2012

(51) Int. Cl.
*H04N 21/482* (2011.01)
*H04N 21/4782* (2011.01)
*H04N 21/436* (2011.01)
*H04N 21/462* (2011.01)

(52) U.S. Cl.
CPC ... *H04N 21/4828* (2013.01); *H04N 21/43615* (2013.01); *H04N 21/4622* (2013.01); *H04N 21/4782* (2013.01); *H04N 21/4821* (2013.01)

(58) Field of Classification Search
CPC .................................................. H04N 21/4828
USPC ..... 386/124; 725/38, 46; 715/822, 825, 838, 715/767, 726; 348/211.99; 707/E17.014
See application file for complete search history.

(56) References Cited

U.S. PATENT DOCUMENTS

| | | | |
|---|---|---|---|
| 7,487,460 B2 * | 2/2009 | Benson et al. | 715/767 |
| 7,577,921 B2 * | 8/2009 | Zink | 715/822 |
| 8,381,249 B2 | 2/2013 | Rasanen et al. | |
| 2001/0028785 A1 * | 10/2001 | Okada | 386/68 |
| 2003/0084449 A1 * | 5/2003 | Chane et al. | 725/46 |
| 2005/0206975 A1 * | 9/2005 | Funazaki | 358/505 |
| 2007/0058047 A1 * | 3/2007 | Henty | 348/211.99 |
| 2007/0162428 A1 | 7/2007 | Williams et al. | |
| 2008/0052742 A1 * | 2/2008 | Kopf et al. | 725/34 |
| 2008/0086747 A1 | 4/2008 | Rasanen et al. | |
| 2008/0112690 A1 * | 5/2008 | Shahraray et al. | 386/124 |
| 2008/0163307 A1 * | 7/2008 | Coburn et al. | 725/61 |
| 2008/0195588 A1 * | 8/2008 | Kim et al. | 707/3 |

(Continued)

FOREIGN PATENT DOCUMENTS

| | | |
|---|---|---|
| CA | 2668164 A1 | 5/2008 |
| CN | 101523390 A | 9/2009 |

(Continued)

OTHER PUBLICATIONS

Cody Barbierri, "Clicker Launches Internet Video Guide Based on HTML5 at Google I/O", http://media.venturebeat.com/2010/05/19/clicker-tv/, May 19, 2010.

Microsoft, "TV Guide Online Delivers Video Guide Using Microsoft Technologies", http://www.microsoft.com/casestudies/Case_Study_Detail.aspx?CaseStudyID=4000000149, Dec. 6, 2007.

(Continued)

*Primary Examiner* — Nasser Goodarzi
*Assistant Examiner* — Adil Ocak
(74) *Attorney, Agent, or Firm* — John L. Rogitz

(57) ABSTRACT

A TV display presents a grid of thumbnails representing content available for display from the Internet and next to the grid, a column of thumbnails representing content that conforms to a user-entered query. The conforming content is located by searching the Internet, from an EPG, from local TV storage, and from the TV's home network. Search result thumbnails are prioritized according to user navigation history.

20 Claims, 2 Drawing Sheets

(56) References Cited

U.S. PATENT DOCUMENTS

| | | | |
|---|---|---|---|
| 2009/0064222 A1* | 3/2009 | Dawson et al. | 725/38 |
| 2009/0077055 A1* | 3/2009 | Dillon et al. | 707/5 |
| 2009/0132942 A1 | 5/2009 | Santoro et al. | |
| 2009/0150379 A1* | 6/2009 | Park et al. | 707/5 |
| 2009/0150934 A1 | 6/2009 | Kamen et al. | |
| 2009/0172736 A1 | 7/2009 | Tsui et al. | |
| 2009/0271368 A1* | 10/2009 | Channell | 707/3 |
| 2010/0198822 A1 | 8/2010 | Gelnnon et al. | |
| 2011/0023068 A1* | 1/2011 | Zeldis et al. | 725/61 |
| 2011/0167385 A1* | 7/2011 | Charrue et al. | 715/825 |

FOREIGN PATENT DOCUMENTS

| | | |
|---|---|---|
| CN | 101796470 B | 10/2013 |
| JP | 2007110304 | 4/2007 |
| JP | 2008040692 | 2/2008 |
| JP | 2010502100 | 1/2010 |
| JP | 2010508603 | 3/2010 |
| JP | 2010115098 | 5/2010 |
| KR | 20090061664 | 6/2009 |
| WO | 2008/024197 | 2/2008 |
| WO | 2008045305 | 4/2008 |
| WO | 2008/057345 | 5/2008 |
| WO | 2008051331 B1 | 8/2008 |

OTHER PUBLICATIONS

TV Genius, Relevant Recommendations and Personalized EPG Search on TV, Web and Mobile, http:///www.tvgenius.net/.

* cited by examiner

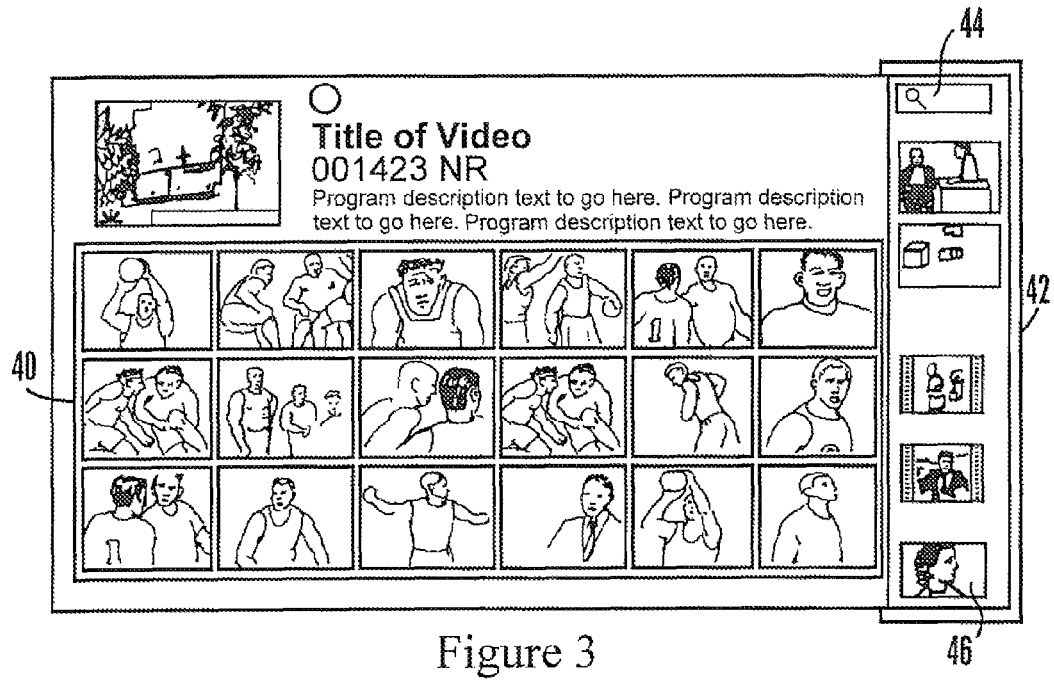
Figure 3
Figure 4
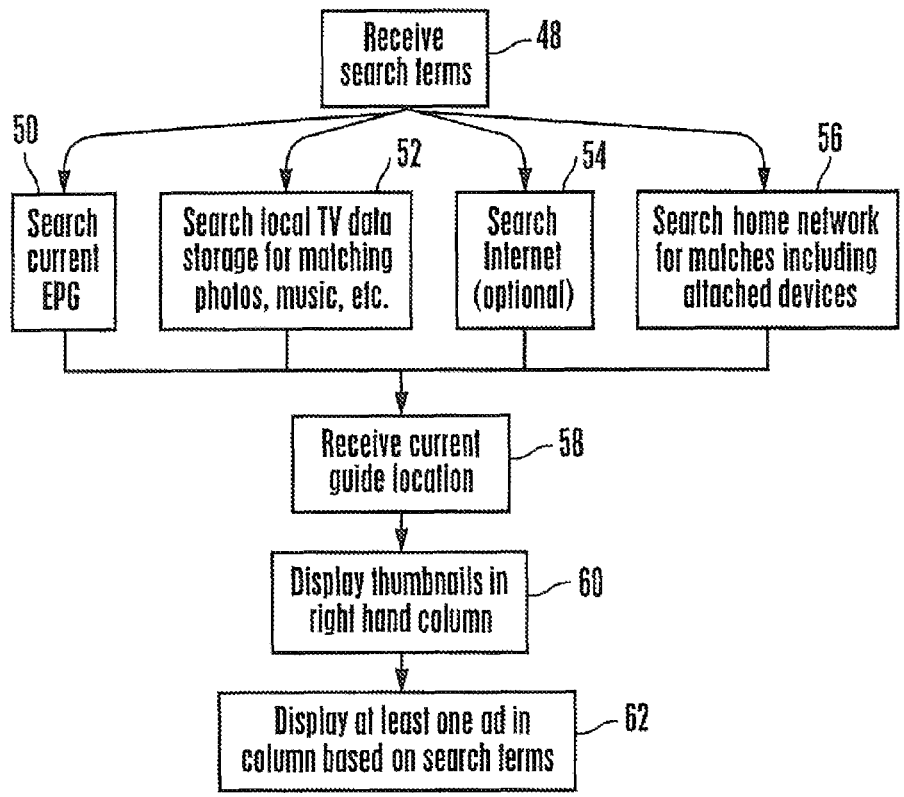

SEARCH QUERY COLUMN FOR INTERNET-CONNECTED TV'S

I. FIELD OF THE INVENTION

The present invention implements user-directed search and display methods in TV's connected to the interne, although the search itself is not limited to the internet as a sole source.

II. BACKGROUND OF THE INVENTION

The goal of marrying internet and television had been achieved by enabling networking connections built directly into TVs. Consumers can enjoy content stored on internet servers viewed on a TV display screen while also being able to view broadcast TV and content from other devices such as cassette and disc players. The number of viewers who watch entire TV shows on their computers has greatly increased, thereby raising the potential for those same viewers to watch TV shows found on the internet on their TV sets. Companies such as Netflix Inc. have capitalized on utilizing the worldwide internet to provide viewers with movies, which with the marriage of internet with TV, can be accessed on home TVs directly connected to the internet.

As understood herein, it would be advantageous to provide for user-directed search controlled by the TV processor to search a variety of sources and display results including advertisements based on assumptions about the user's demographics.

SUMMARY OF THE INVENTION

The present invention implements a search toolbar on the right hand side of a TV display screen containing search results from a variety of sources, namely the Internet. This search toolbar is additional to the main portion of the screen that contains available videos that may be streamed from the Internet. The search toolbar is often in the form of a column and contains at least one advertisement based on the user's search query.

Accordingly, an Internet-connected video display device has a video display and a processor controlling the video display to present a main window in which plural thumbnails of videos are arranged. The videos are available through the Internet for presentation on the display. The processor further causes a column of thumbnails to be presented on the display next to the main window. At least some of the thumbnails in the column of thumbnails represent content that is identified as conforming to a user-entered search query.

In some embodiments the column of thumbnails is presented on a right side portion of the display. One or more thumbnails in the column of thumbnails can represent advertisements. The advertisements may be selected based on at least one assumption about a user's demographics based upon the user-entered search query.

If desired, the processor, responsive to the user-entered search query, searches (a) a local TV data storage for photos, video, and music, (b) a TV electronic program guide (EPG) received from a TV signal provider. The processor, responsive to the user-entered search query, may also search (c) the Internet, and (d) devices in a home network communicating with the TV.

If desired, the processor can cause the display to present a top level menu having an entry for Internet TV which, when selected by a user, causes the main window to be presented on the display. Thumbnails may be arranged in the column of thumbnails in accordance with a priority of search results based upon prior user navigation using the TV display.

In another aspect, a video display apparatus includes a TV display presenting a cross-media bar (XMB) comprising a horizontal row of icons representing respective genre, one which genre is an Internet TV genus. Responsive to a cursor highlight of the Internet TV genus a column of entries appears below an icon representing the Internet TV genus, one of the entries of which is selectable to cause a presentation to appear on the display showing a main set of thumbnails of Internet videos that are available for presentation on the display and a search set of thumbnails showing thumbnails representing results of a user-entered search query.

In another aspect, a method includes receiving, at a video display device, a search query and responsive to the search query, searching an electronic program guide (EPG) received from a TV content provider for audio and/or video content conforming to the query. Responsive to the search query, the method searches local TV data storage for audio and/or video content conforming to the query, receives a user navigation location, and displays thumbnails on the video display device representing results conforming to the query with the thumbnails arranged on the display device according to a priority defined by the user navigation location.

BRIEF DESCRIPTION OF THE DRAWINGS

FIG. 3 is a screen shot displaying a main portion consisting of videos available via the Internet and an adjacent portion consisting of user-entered search query content; and FIG. 4 is a flow chart presenting example logic involved in the processor's sequence of events following a user-entered search query.

DETAILED DESCRIPTION OF THE PREFERRED EMBODIMENT

Figure 1:
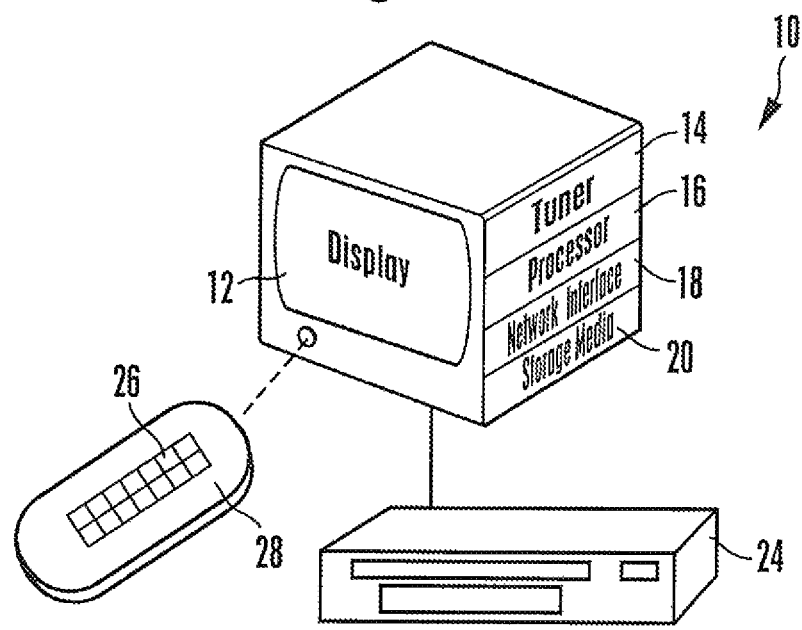
FIG. 1 is a block diagram of a display device, here a TV, showing internal and external components systematically.

Initially referring to FIG. 1, a TV, generally designated 10, contains a display screen 12. A tuner 14, processor 16, network interface (NI) 18, and storage media (SM) device 20 are internally mounted on the TV 10. The network interface 18 can connect to one or more internet multimedia content sources 22 via either hardwire or wireless signal. Additionally, a disk player 24 such as a DVD or Blu-Ray® player can connect to the TV 10. A keypad 26 on a wireless remote 28 can input information and direct the processor 1.6 to display desired media on the display screen 12.

Figure 2:
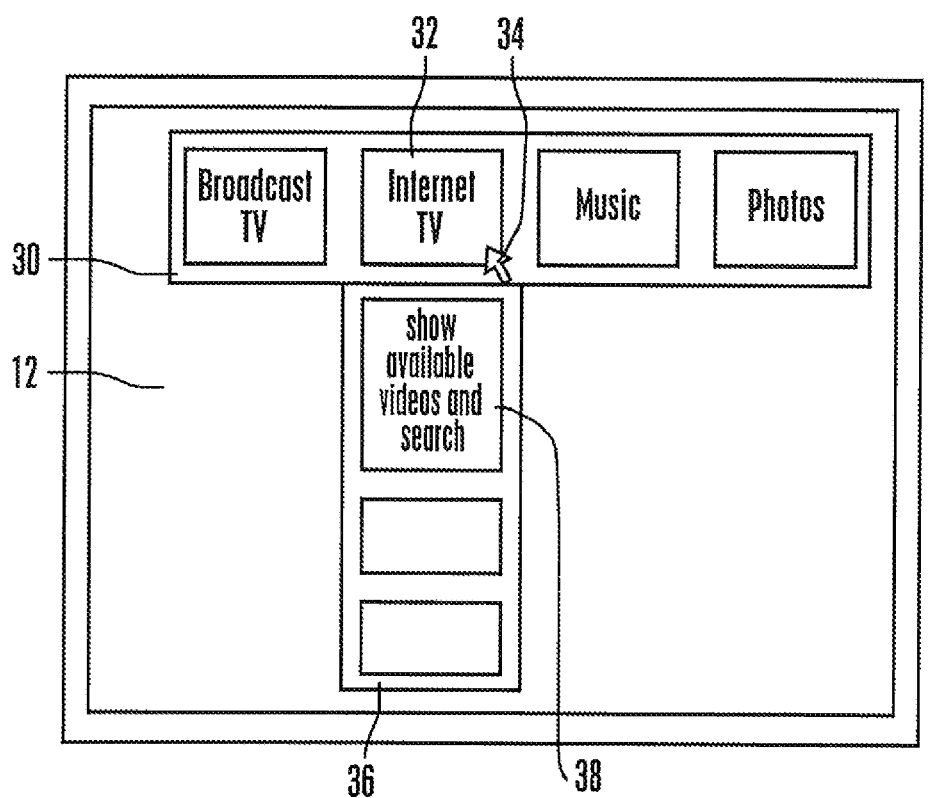
FIG. 2 is a screen shot of TV display showing a cross media bar with a drop down menu.

Moving in reference to FIG. 2, the display screen 12 presents the user with a main window containing a user interface such as but not limited to a cross media bar (XMB) 30, which in turn includes icons representing respective input genre, one of which is "Internet TV" 32. When a cursor 34 controlled by the keypad 26 on remote 28, as seen in FIG. 1, is placed over the icon Internet TV 32, an additional drop-down column 36 is presented to the user with plural selectable icons, one of which is "show available videos and search" 38.

Upon selection of the "show available videos and search" icon 38, the processor 16 controls the display screen 12 to display a screen shot, herein referred to as FIG. 3. The main window of FIG. 3 contains an arrangement of plural thumbnails 40 of videos available via the Internet 22. Selection of a thumbnail causes the processor 16 to stream the corresponding video to the TV 10 from the Internet 22 and present it on the display screen 12.

In addition to the main window with the arrangement of thumbnails 40, the processor 16 also directs the display screen 12 to present a column of thumbnails 42 adjacent to the main window, herein on the right side of FIG. 3 in the non-limiting example shown. Each thumbnail 42 represents a respective multimedia file such as a video, a photograph, etc. The content of the multimedia files represented by the column of thumbnails 42 conforms to a user-directed search query 44 at the top of the column 42. The user may enter desired keywords into the query 44 by using the keypad 26 on remote 28. The processor 16 searches for content pertaining to the user's keyword(s) on multiple sources including: a local TV data storage such as the storage media 20 for photos, video, and music, a TV electronic program guide (EPG) received from a TV signal provider, the. Internet, and devices in a home network communicating with the TV 10 such as the disc player 24. At least one of the thumbnails may represent an advertisement 46 selected based on at least one assumption about the user's demographics based on the user-enter search query 44.

Moving in reference to the flow chart in FIG. 4, block 48 begins the sequence of logic with the processor 16 receiving the user's search keyword(s) entered into the search query 44. The processor 16 then searches available sources at the following blocks: the electronic program guide 50, local TV storage media 52 for music, photos, etc., Internet 54 (optional), and home network 56 for matches including attached devices such as the disc player 24. Once content is received, the processor 16 receives the current guide location at block 58 and displays thumbnails of the received content at block 60. The thumbnails are ordered in the column 42 in accordance with a priority of search results based upon prior user navigation using the TV display 12. For example, if the user had last navigated to "photos" then photographs conforming to the search terms are given priority in the returned results by, e.g., placing their respective thumbnails higher in the right-hand column than lower. The processor 16 also displays at block 62 at least one advertisement 46 based on the user's search query.

What is claimed is:

1. An Internet-connected video display device, comprising:
   computer readable storage medium storing executable instructions;
   processor configured to access the instructions to configure the processor for controlling a video display and responsive to a first input command to present a main window in which plural thumbnails of videos are arranged, the videos being available through the Internet for presentation on the display, the processor when executing the instructions presenting a video represented by a respective thumbnail in the main window responsive to selection of the respective thumbnail;
   the processor when executing the instructions being further configured for, responsive to the first command, causing a column of thumbnails to be presented on the display next to the main window, at least some of the thumbnails in the column of thumbnails representing content that conforms to a user-entered search query, wherein thumbnails are arranged in the column of thumbnails in accordance with a priority of search results based upon prior user navigation using the TV display, wherein at least a first thumbnail in a first multimedia genus is prioritized in the list with respect to at least a second thumbnail in a second multimedia genus responsive to a determination that the first thumbnail is in the first multimedia genus and that the user has most recently navigated to an object in the first genus.

2. The device of claim 1, wherein the column of thumbnails is presented on a right side portion of the display.

3. The device of claim 1, wherein at least one thumbnail in the column of thumbnails represents an advertisement.

4. The device of claim 3, wherein the advertisement is selected based on at least one assumption about a user's demographics based upon the user-entered search query.

5. The device of claim 1, wherein the processor responsive to the user-entered search query searches (a) a local TV data storage for photos, video, and music, (b) a TV electronic program guide (EPG) received from a TV signal provider.

6. The device of claim 5, wherein the processor responsive to the user-entered search query also searches (c) the Internet, and (d) devices in a home network communicating with the TV.

7. The device of claim 1, wherein the processor causes the display to present a top level menu having an entry for Internet TV which, when selected by a user, causes the main window to be presented on the display.

8. Video display apparatus comprising:
   display configured for presenting a cross-media bar (XMB) comprising a horizontal row of icons representing respective genre, one which genre is an Internet TV genus, wherein responsive to cursor highlight of the Internet TV genus a column of entries appears below an icon representing the Internet TV genus, one of the entries being selectable to cause a presentation to appear on the display showing a main set of thumbnails of Internet videos available for presentation on the display and simultaneously with the main set of thumbnails, also cause a search set of thumbnails showing thumbnails representing results of a user-entered search query and arranged in a column beside the main set of thumbnails, wherein at least a first thumbnail in a first multimedia genus is prioritized in the search set of thumbnails with respect to at least a second thumbnail in a second multimedia genus responsive to a determination that the first thumbnail is in the first multimedia genus and that the user most recently navigated to an object in the first genus.

9. The apparatus of claim 8, wherein the display is configured to be controlled by a processor.

10. The apparatus of claim 9, wherein the processor responsive to the user-entered search query searches (a) a local TV data storage for photos, video, and music, (b) a TV electronic program guide (EPG) received from a TV signal provider.

11. The apparatus of claim 10, wherein the processor responsive to the user-entered search query also searches (c) the Internet, and (d) devices in a home network communicating with the TV.

12. The apparatus of claim 8, wherein at least one thumbnail in the search set of thumbnails represents an advertisement.

13. The apparatus of claim 12, wherein the advertisement is selected based on at least one assumption about a user's demographics based upon the user-entered search query.

14. A method comprising:

controlling a video display;

responsive to a first input command to present a main window in which plural thumbnails of videos are arranged, the videos being available through the Internet for presentation on the display, presenting a video represented by a respective thumbnail in the main window responsive to selection of the respective thumbnail;

responsive to the first command, causing a column of thumbnails to be presented on the display next to the main window, at least some of the thumbnails in the column of thumbnails representing content that conforms to a user-entered search query, wherein thumbnails are arranged in the column of thumbnails in accordance with a priority of search results based upon prior user navigation using the TV display, wherein at least a first thumbnail in a first multimedia genus is prioritized in the list with respect to at least a second thumbnail in a second multimedia genus responsive to a determination that the first thumbnail is in the first multimedia genus and that the user has most recently navigated to an object in the first genus.

15. The method of claim 14, wherein the column of thumbnails is presented on a right side portion of the display.

16. The method of claim 14, wherein at least one thumbnail in the column of thumbnails represents an advertisement.

17. The method of claim 16, wherein the advertisement is selected based on at least one assumption about a user's demographics based upon the user-entered search query.

18. The method of claim 14, comprising, responsive to the user-entered search query, searching (a) a local TV data storage for photos, video, and music, (b) a TV electronic program guide (EPG) received from a TV signal provider.

19. The method of claim 18, comprising, responsive to the user-entered search query, also searching (c) the Internet, and (d) devices in a home network communicating with the TV.

20. The method of claim 14, comprising causing the display to present a top level menu having an entry for Internet TV which, when selected by a user, causes the main window to be presented on the display.

* * * * *